April 25, 1967     A. SCHMITT     3,315,945

MIXING DEVICE

Filed Dec. 6, 1965

INVENTOR

Alfred Schmitt

By Pierce, Scheffler & Parker
Attorneys 3,315,945
MIXING DEVICE
Alfred Schmitt, Ludwigshafen (Rhine), Germany, assignor to J. Engelsmann AG, Ludwigshafen (Rhine), Germany
Filed Dec. 6, 1965, Ser. No. 511,825
5 Claims. (Cl. 259—72)

The present invention relates to mixing devices and more particularly to an improved arrangement for mixing powder, granular, liquid or other contents of a packing or shipping container without having to remove the contents from the container, or to open the container.

In accordance with the invention, the mixing device is comprised of a frame which includes means for mounting therein the filled and closed container. The frame is arranged to be rotated either by rolling it back and forth on the floor or ground, or by supporting it for revolving about its axis. The container is detachably secured within the frame with its axis set obliquely to the axis of rotation of the frame, and the securing means for the frame can, with added advantages, be made adjustable so as to enable the angle of inclination as between the frame and container to be adjusted as well as enable the frame to accommodate containers of different sizes and configurations. Preferably the securing means for the container within the frame is of the quick-acting type and may, for example, include a pair of clamping bands the ends of which are secured together around the container by means of a toggle latch.

Mixing devices of various forms are known wherein a mixing vessel is permanently mounted on a stand for rotation about an oblique axis. However, the disadvantage with these known mixing devices is that the material to be mixed must first be emptied from its packing or shipping container into the mixing vessel, then mixed, and then filled again into the container, thus necessitating two additional operations which entail both additional time as well as labor. Moreover, the mixing vessel must be filled and emptied through tightly sealable conduits. All of these disadvantages are obviated by means of the present invention since the contents of the container desired to be mixed do not have to be removed from the container and hence, the latter can remain closed until the contents have been mixed and are thus readied for use.

In accordance with another aspect of the present invention, the container with its contents to be mixed do not have to be lifted into the frame but rather the frame is simply tipped over the container with the latter standing on end, the container is then secured in place within the frame by means of a quick-detachable clamping band, and the frame with the container secured therein in an oblique attitude is then tipped back to its upright position ready for rolling. As the frame is rolled, the container will be turned over and over thus thoroughly mixing the contents. The roll frame can be used to transport the container from one place to another and achieve mixing at the same time. Alternatively, the frame can be placed on a power driven rotating device by which the frame and container are then revolved about the frame axis.

Other features of the inventive concept will become more apparent from the following detailed description of one suitable embodiment and from the accompanying drawings wherein.

Figure 1:
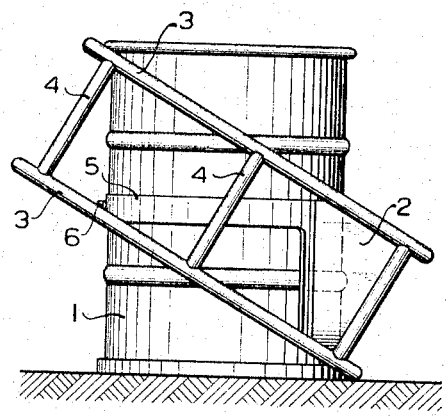
FIG. 1 is a view of the filled container with the roll frame tipped into the position over the container at which the container is secured in place within the frame.

With reference now to the drawings, the container having contents therein to be mixed is shown at 1 and is seen to have the configuration of a cylindrical drum. The contents can be granular, powders, or liquid mixtures or any other materials desired to be mixed. The configuration of the container 1 is likewise not of any particular importance. The roll frame can also have different configurations. In the present embodiment, it is comprised of two parallel spaced, coaxially arranged circular hoops 3 which are connected together at various points about their periphery by cross bars 4. A rest 2 within the roll frame and which is inclined to the axis of the frame is provided for supporting the container 1 obliquely on its side, and associated with the rest 2 are a pair of band-like members or straps 5 the ends of which terminate in a quick-detachable connection 6 which can be of the toggle type.

Figure 2:
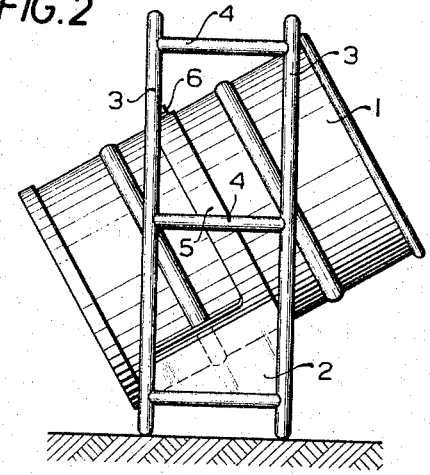
FIG. 2 is a view of the roll frame and container secured therein after the frame has been tipped back to its upright, rolling i.e. mixing position.

As shown in the drawings in the sequential views of FIGS. 1 and 2, the mixing operation is initiated by standing the filled and closed container on one end, and then tipping the roll frame 2–3–4 over it into the position shown in FIG. 1 so that the side of the container comes into engagement with rest 2. The bands 5 are then passed in opposite directions around the girth of the container and joined together at latch 6. This initial operation thus secures container 1 rigidly within the roll frame and with the container axis located obliquely to the axis of the roll frame. The roll frame is then tipped back into the position shown in FIG. 2 ready for rolling thus to mix the contents of the container. The container mounting arrangement of FIGS. 1 and 2 is quite practical and has the advantage of making it possible, because of the favorable leverage effect, to mount quite heavy containers and tilt them upwardly into the mixing position with considerable ease.

When the container and frame are in the position shown in FIG. 2, the contents of the container 1 can now be mixed by rolling the frame over and over along the floor—or even back and forth along the floor. The mixing effect is thorough due to the compound motion which occurs as a result of the axis of the container being located obliquely to the roll axis of the frame.

Figure 3:
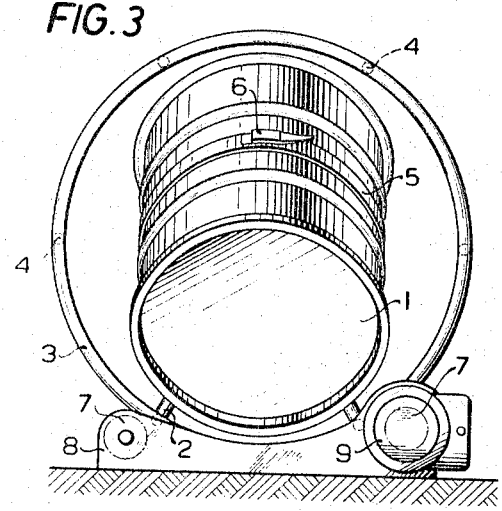
FIG. 3 is an end elevation of the frame and container placed on a power driven rolling apparatus by which the frame is revolved about its axis.
Figure 4:
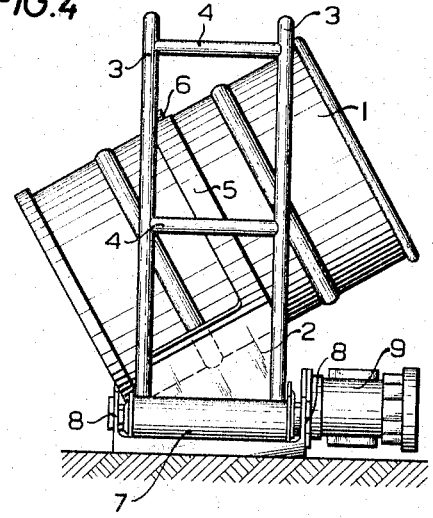
FIG. 4 is a side elevation of the frame and container on the revolving apparatus.

In lieu of manually rolling the frame along the floor, mixing can be achieved by revolving the frame about its axis. Such an arrangement is illustrated in FIGS. 3 and 4. Here it will be seen that a base 8 is provided and on which are rotatably mounted two roll cylinders 7 in parallel spaced relation. The hoops 3 of the roll frame are simply lifted onto these roll cylinders and one of them is then driven by any suitable power means such as a motor 9, connected to the cylinder 7 by means of a gear transmission. If desired, a friction cover such as rubber or plastic can be applied to the roll cylinders 7 to increase the driving friction with the hoops 3 of the roll frame. Also, if desired, the support 8 may be provided with a plurality of driving means so that a plurality of containers within their frames may be revolved at the same time.

The use of straps or bands 5 enables containers of different sizes and configuration to be secured in place within the roll frame. Moreover, the rest member 2 can be arranged so as to provide different angles of oblique repose of the container within the frame and thus vary the intensity of the mixing which is achieved. Moreover, the hoops 3 do not require a circular configuration for the rolling, mixing operation. They can be given an elliptical configuration or even a polygonal configuration with more than four sides, thus to impart further additional components of mixing movements to the contents within the container.

I claim:

1. A device for mixing fluent material within a generally cylindrical packing or transport container, which comprises a light-weight roll frame having the approximate shape of a cylindrical roller, and adjustable means for supporting and releasably securing such container in said roller with its axis in oblique relation to the roller frame axis, said securing means being movably arranged within said roller frame so as to permit the accommodation of containers of diverse sizes and shapes and variations in the inclination of such container with respect to said roll frame axis.

2. Apparatus as defined in claim 1 wherein said supporting and securing means within said roll frame comprises a rest member having a container supporting surface disposed oblique to the axis of said roll frame.

3. Apparatus as defined in claim 1 and which further includes in combination therewith a revolving device for said roll frame which comprises a base member, a pair of spaced roll cylinders between and upon which said roll frame is disposed, and motor means for revolving at least one of said roll cylinders thereby revolving said roll frame about its axis.

4. Apparatus of the class described comprising a frame having a configuration approximating that of a cylindrical roller and hence such as to enable said frame to be rolled about its axis, and means within said frame for supporting and securing therein a container such that the axis of the container is oblique to the axis of rotation of said frame, said supporting and securing means comprising a rest member having a container supporting surface disposed obliquely to the axis of said frame, which apparatus further includes means for adjusting the inclination of said container supporting surface of said rest member.

5. Apparatus of the class described comprising a frame having a configuration approximating that of a cylindrical roller and hence such as to enable said frame to be rolled about its axis, and means within said frame for supporting and securing therein a container such that the axis of the container is oblique to the axis of rotation of said frame, in which apparatus said supporting and securing means within said roll frame comprises a rest member having a container supporting surface disposed oblique to the axis of said roll frame, strap means extending from said rest member for encircling the container, and means detachably connecting the ends of said strap means.

References Cited by the Examiner

UNITED STATES PATENTS

| 1,790,319 | 1/1931 | Rall et al. | 259—81 |
| 3,090,604 | 5/1963 | Wheeler | 259—81 |

FOREIGN PATENTS

| 412,621 | 7/1934 | Great Britain. |

WALTER A. SCHEEL, *Primary Examiner.*
ROBERT W. JENKINS, *Examiner.*